(12) United States Patent
Ovando (10) Patent No.: US 9,070,009 B2
(45) Date of Patent: *Jun. 30, 2015

(54) REMOTE ENCODING CENTER AUTOMATION SYSTEMS AND METHODS

(71) Applicant: Lockheed Martin Corporation, Bethesda, MD (US)

(72) Inventor: Edward Ovando, Endicott, NY (US)

(73) Assignee: Lockheed Martin Corporation, Bethesda, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/092,940

(22) Filed: Nov. 28, 2013

(65) Prior Publication Data

US 2014/0086447 A1 Mar. 27, 2014

Related U.S. Application Data

(63) Continuation of application No. 13/351,749, filed on Jan. 17, 2012, now Pat. No. 8,625,841.

(51) Int. Cl.
| | |
|---|---|
| G06K 9/00 | (2006.01) |
| B07C 3/12 | (2006.01) |
| G06Q 10/08 | (2012.01) |
| G06Q 50/32 | (2012.01) |

(52) U.S. Cl.
CPC .............. *G06K 9/00442* (2013.01); *B07C 3/12* (2013.01); *G06Q 10/08* (2013.01); *G06Q 50/32* (2013.01)

(58) Field of Classification Search
None
See application file for complete search history.

(56) References Cited

U.S. PATENT DOCUMENTS

| | | |
|---|---|---|
| 4,632,252 A | 12/1986 | Haruki et al. |
| 5,142,482 A | 8/1992 | Sansone |
| 5,420,403 A | 5/1995 | Allum et al. |
| 6,665,422 B1 | 12/2003 | Seidel et al. |
| 6,741,724 B1 | 5/2004 | Bruce et al. |
| 7,138,596 B2 | 11/2006 | Pippin et al. |
| 7,442,897 B2 | 10/2008 | Avant et al. |
| 7,698,147 B2 | 4/2010 | Latta |
| 7,765,024 B2 | 7/2010 | Brandt et al. |
| 7,801,925 B2 | 9/2010 | Dearing et al. |
| 7,826,922 B2 | 11/2010 | Brandt et al. |
| 7,847,206 B2 | 12/2010 | Brandt |
| 7,883,013 B2 | 2/2011 | Skaaksrud et al. |
| 7,885,844 B1 | 2/2011 | Cohen et al. |
| 7,925,046 B2 | 4/2011 | Rundle et al. |
| 2003/0047494 A1* | 3/2003 | Lhomme ........................ 209/584 |
| 2004/0049546 A1 | 3/2004 | Yoshida |

(Continued)

*Primary Examiner* — Atiba O Fitzpatrick
(74) *Attorney, Agent, or Firm* — Miles & Stockbridge P.C.; James T. Carmichael (57) ABSTRACT

A nontransitory computer readable medium having stored thereon software instructions that, when executed by a computer, cause the computer to perform operations. The operations can include intercepting a request for manual processing of a mail piece image. The request can be transmitted by an originating MPE having failed to resolve the mail piece image. The request can be ignored and the mail piece scan image can be forwarded to an automated mail recognition system (AMRS). If the AMRS successfully resolved the image, a response, including a plurality of addressing data corresponding to the mail piece scan image, can be received from the AMRS. If the AMRS successfully resolved the image, at least a portion of the plurality of addressing data can be transmitted to the originating MPE. If the AMRS did not successfully resolve the image, the request can be forwarded to a manual mail recognition processing system.

18 Claims, 8 Drawing Sheets

(56) References Cited

U.S. PATENT DOCUMENTS

| | | |
|---|---|---|
| 2005/0131576 A1 | 6/2005 | De Leo et al. |
| 2007/0098216 A1 | 5/2007 | Goyal et al. |
| 2007/0098217 A1 | 5/2007 | Goyal et al. |
| 2007/0204007 A1 | 8/2007 | Ashaari et al. |
| 2007/0239313 A1 | 10/2007 | Goyal et al. |
| 2008/0183329 A1 | 7/2008 | Gilham et al. |
| 2009/0028383 A1 | 1/2009 | Bayer |
| 2009/0139914 A1 | 6/2009 | Brandt |
| 2010/0040256 A1 | 2/2010 | Rundle |
| 2011/0035224 A1 | 2/2011 | Sipe |
| 2012/0182588 A1 | 7/2012 | Mampe et al. |

* cited by examiner

REMOTE ENCODING CENTER AUTOMATION SYSTEMS AND METHODS

Embodiments relate generally to mail processing and, more particularly, to remote encoding center automation systems and methods providing automated mail piece image recognition processing to existing manual remote encoding centers.

Postal services, such as the United States Postal Service (USPS), may send large volumes of images of mail pieces that cannot be reliably resolved with their primary automation equipment to Remote Encoding Centers (RECs). The Remote Encoding Centers (RECs) may employ many human workers who view the mail piece images and manually resolve the image by determining the correct addressing information associated with the mail piece. Current automated mail recognition systems and methods may have higher success rates than the automation equipment currently deployed in the field by a postal service. Updating automation equipment currently deployed across a postal service's delivery area (for example the entire United States for the USPS) may not be technically feasible due to technical limitations of the legacy components still in use and may not be economically feasible due to deployment costs, contractual obligations, and/or the proprietary nature of some automation equipment. A need may exist to retrofit the existing Remote Encoding Centers (RECs) to provide improved automated mail recognition processing of all mail piece images received by the Remote Encoding Centers (RECs) and manually processing of only those images that cannot be resolved by the improved automated mail recognition processing.

One embodiment includes a computer system configured to provide automated mail recognition processing to a legacy manual mail recognition processing system. The computer system can include a processor and a memory coupled to the processor. The memory can store software instructions that, when executed by the processor, cause the processor to perform operations. The operations can include receiving a manual mail recognition processing request from an originating mail processing component. The manual mail recognition processing request can include a mail piece scan image that the originating mail processing component failed to automatically resolve an address in. The manual mail recognition processing request can request manual processing of the mail piece scan image by a human and the mail piece scan image can comprise a digital image of at least a portion of a mail piece. The digital image can capture a plurality of digital image addressing information associated with the mail piece. The operations can also include ignoring the request for manual processing of the mail piece scan image by a human and performing automated mail recognition processing of the mail piece scan image. If the automated mail recognition processing is successful, the automated mail recognition processing can include creating a plurality of computer recognized address portions corresponding to the plurality of digital image addressing information associated with the mail piece. If the automated mail recognition processing is successful, a mail piece scan image processing result can be created containing the plurality of computer recognized address portions. If the automated mail recognition processing is successful and the mail piece scan image processing results contains the plurality of computer recognized address portions, the mail piece scan image processing result can be transmitted to the originating mail processing component. If the automated mail recognition processing is not successful and the mail piece scan image processing results does not contain the plurality of computer recognized address portions, the mail piece scan image can be transmitted to the manual mail recognition system. The manual mail recognition system can include a plurality of human users performing manual mail recognition of the mail piece image if the mail piece scan image is transmitted to the manual mail recognition system.

Another embodiment can include a method for retrofitting a legacy manual mail recognition system with automated mail recognition processing. The method can include redirecting, at a network component, a mail piece scan image manual processing request to an automated recognition interception computer. The mail piece scan image manual processing request could have been transmitted by a requesting mail processing component. The mail piece scan image manual processing request can include a mail piece scan image. The mail piece scan image can include a digital image that can represent at least a portion of a mail piece. The mail piece scan image manual processing request can request manual mail recognition processing to be performed on the mail piece scan image by a human. The method can also include receiving, at the automated recognition interception computer, a mail piece scan image manual processing request. The mail piece scan image can be processed, including creating a plurality of computer recognized address portions if the processing is successful. The plurality of computer recognized address portions can correspond to the addressing information of the mail piece captured in the mail piece scan image. A mail piece scan image processing result can be generated that includes at least a portion of the plurality of computer recognized address portions if the processing was successful. The method can include transmitting, from the automated recognition interception computer, the mail piece scan image processing result to the requesting mail processing component if the processing was successful. The method can also include transmitting, from the automated recognition interception computer, the mail piece scan image to a manual recognition system for manual processing if the processing was unsuccessful.

Another embodiment can include a nontransitory computer readable medium having stored thereon software instructions that, when executed by a computer, cause the computer to perform a series of operations. The operations can include intercepting a manual mail recognition processing request requesting manual processing of a mail piece image. The manual mail recognition processing request can have been transmitted by an originating mail processing component that can have failed to resolve the mail piece image. After receiving the manual mail recognition processing request, the manual mail recognition processing request can be ignored and instead the mail piece scan image can be forwarded to an automated mail recognition processing system. The operations can include receiving an automated mail recognition processing response from the automated mail recognition processing system. The automated mail recognition processing response can include a plurality of addressing data corresponding to the mail piece scan image if the automated mail recognition processing system was able to successfully resolve the mail piece image. At least a portion of the plurality of addressing data can be transmitted to the originating mail processing component if the automated mail recognition processing system was able to successfully resolve the mail piece scan image. The manual mail recognition processing request can be forwarded to a legacy manual mail recognition processing system if the automated mail recognition processing system was not able to successfully resolve the mail piece scan image.

DETAILED DESCRIPTION

Figure 1:
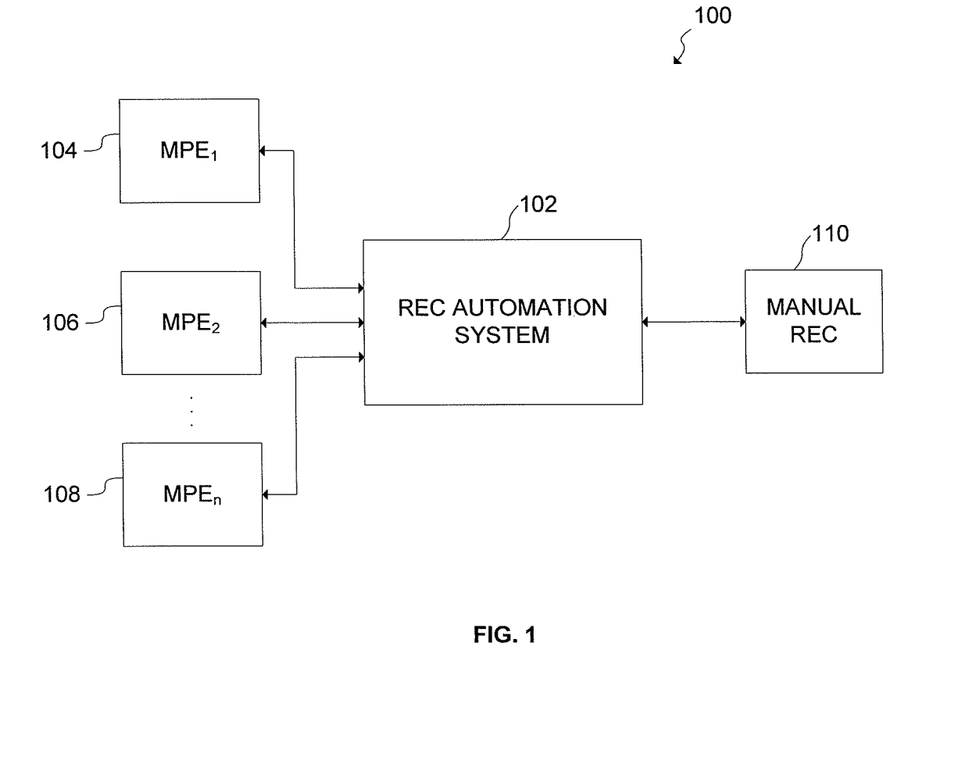
FIG. 1 is a block diagram of an exemplary embodiment of an automated remote encoding system.

FIG. 1 is a block diagram of an exemplary embodiment of an automated remote encoding system. System 100 can include a REC (remote encoding center) automation system 102. The REC automation system 102 can transmit data to and/or receive data from a plurality of MPE (mail processing equipment) 104, 106, and 108. The REC automation system 102 can also transmit data to and/or receive data from a manual REC (remote encoding center) (or manual remote encoding center), 110.

In operation, the plurality of MPE 104, 106, and 108 perform mail recognition processing of mail piece scan images and select unrecognizable images for manual processing by the manual REC 110. The REC automation system 102 can capture and/or intercept those mail piece scan images selected for manual processing before they reach the manual REC 110 and perform automated mail recognition processing of the mail piece scan images according to the processes shown in FIGS. 8, 9, and 10. The REC automation system 102 can be software and/or hardware (e.g., a computer programmed for REC automation). Each of the mail processing equipment 104, 106, and 108 can physically reside in one or more mail processing sites located across the country. The manual REC 110 can include a keyer control center and a plurality of keyer desks as shown in FIGS. 2, 3, 4, 5, 6, and 7.

It will be appreciated that the REC automation system 102 can perform the automated mail recognition processing by utilizing barcode reading, optical character recognition, database queries, and/or any other mail automation techniques. Also, the REC automation system 102 can delegate the mail recognition processing to a centralized mail recognition processing system by transmitting the mail piece scan image to the centralized mail recognition processing system and receiving a processing result from the centralized mail recognition processing system.

It will also be appreciated that the REC automation system 102 can transmit data to and/or receive data from the manual REC 110 and/or the plurality of MPE 104, 106, and 108 and/or a centralized mail recognition processing system via one or more networks, such as but not limited to a local area network (LAN), a wide area network (WAN), the Internet, an intranet, or any other wired or wireless network now known or later developed, or any combination thereof.

It will be appreciated that the REC automation system 102 can transmit data to the plurality of MPE 104, 106, and 108 in a manner that emulates the manual REC 110 such that the plurality of MPE 104, 106, and 108 can receive the data as though it had been transmitted by the manual REC 110. For example, the REC automation system 102 can transmit data to the plurality of MPE 104, 106, and 108 according to the existing manual REC interface protocol.

Figure 2:
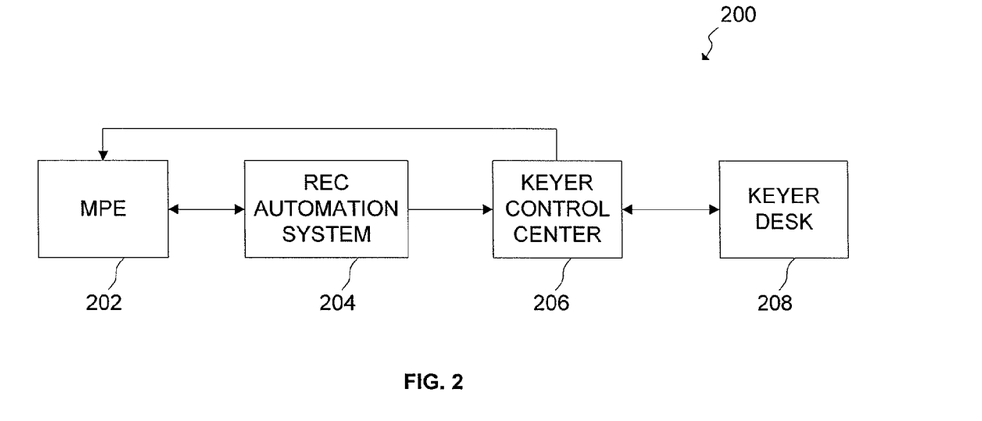
FIG. 2 is a block diagram of an exemplary embodiment of an MPE request intercepting automated remote encoding system.

FIG. 2 is a block diagram of an exemplary embodiment of an MPE request intercepting automated remote encoding system. System 200 can include an MPE (mail processing equipment) 202, an REC (remote encoding center) automation system 204, a keyer control center 206, and/or a keyer desk 208.

In operation, the MPE 202 may be unable to resolve a mail piece scan image and can request manual processing of that image at a manual REC. A manual REC can include a keyer control center 206 that can receive requests for manual processing of mail piece scan images and distribute the images for manual processing to keyer desks, an example of which is given by keyer desk 208. The REC automation system 204 can intercept and/or capture each mail piece scan image transmitted by the MPE 202 before the image is received by the manual REC at the keyer control center 206.

Figure 8:
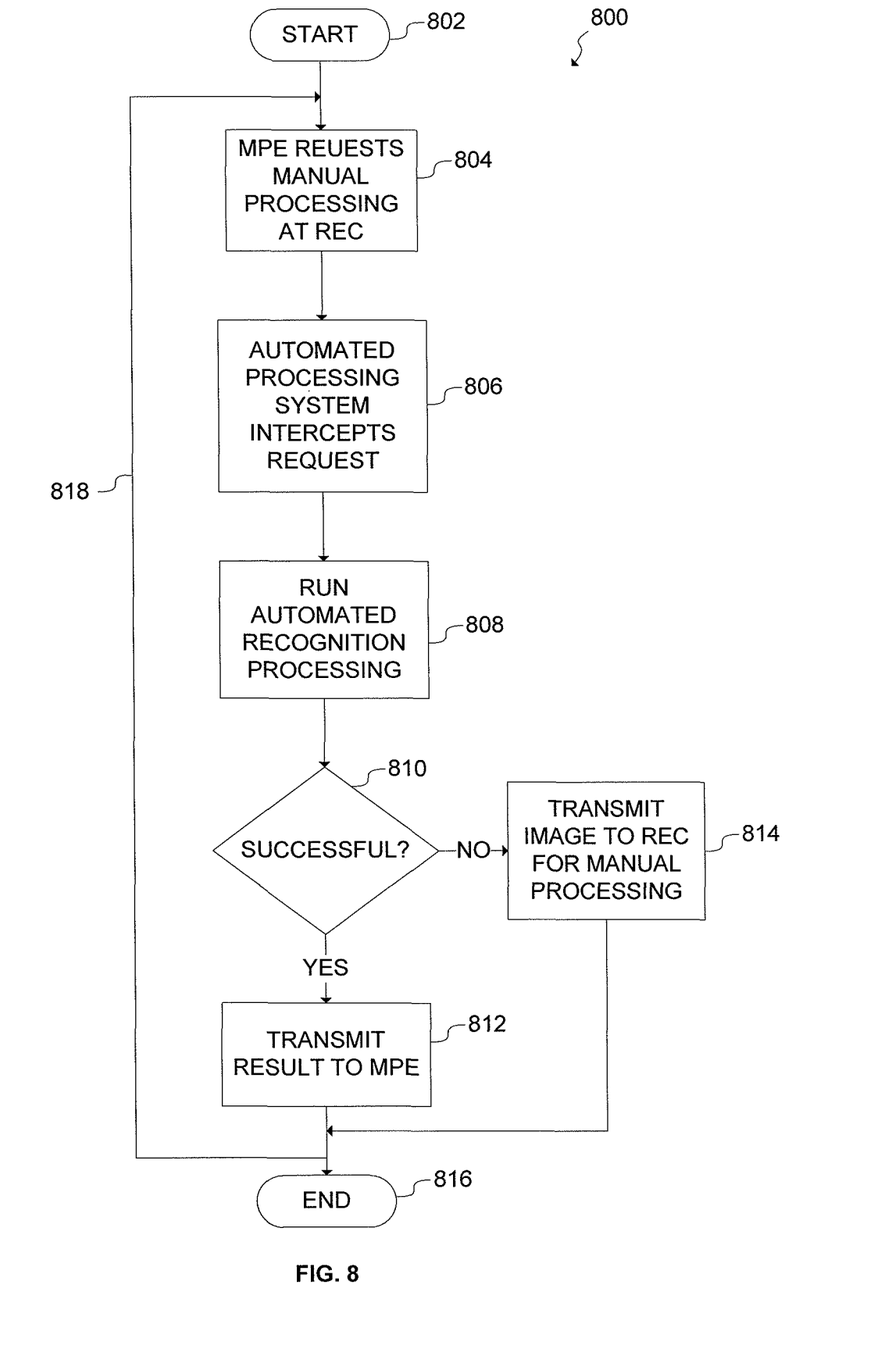
FIG. 8 is a flowchart showing an exemplary method for retrofitting a legacy manual remote encoding center with automated mail recognition processing.
Figure 9:
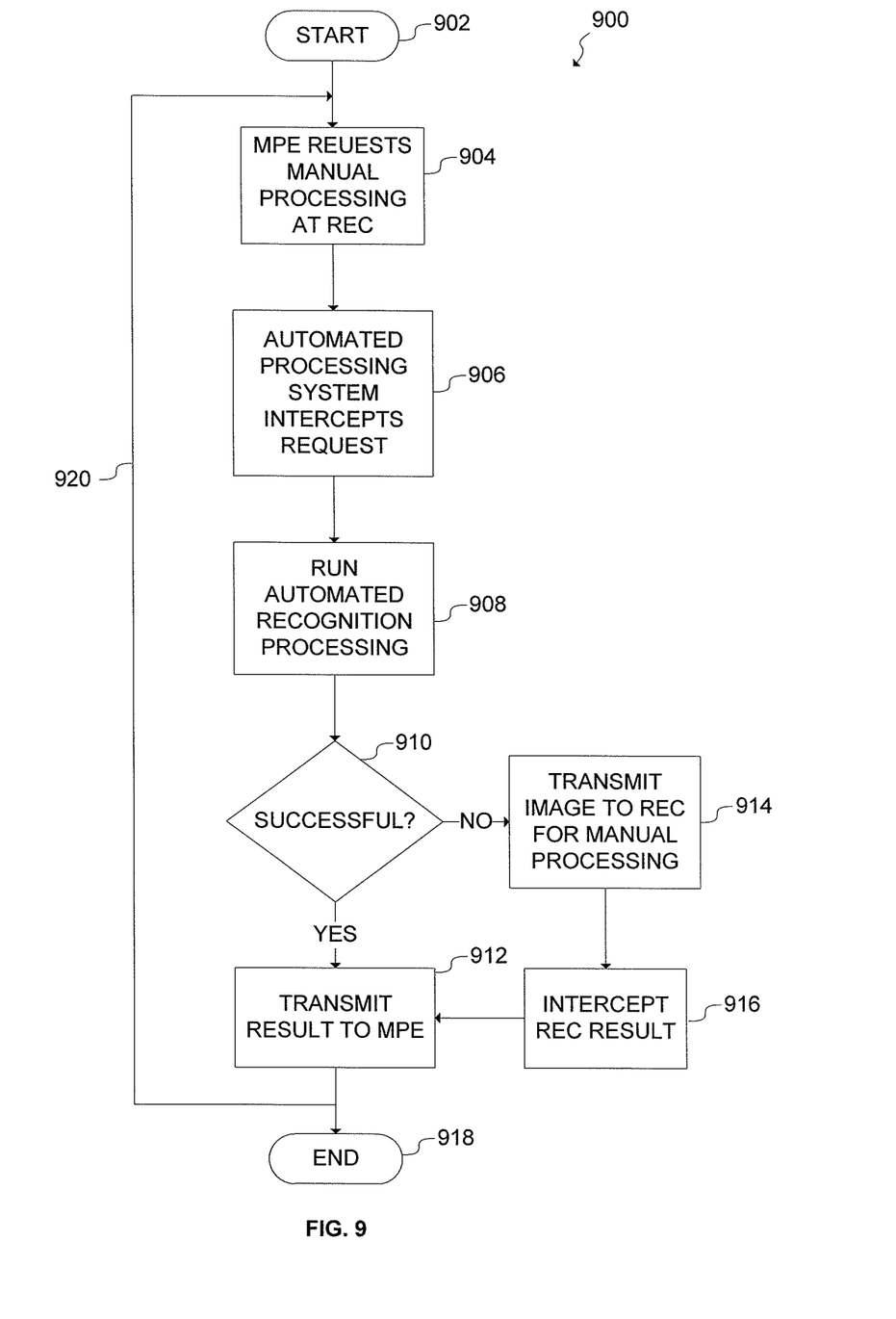
FIG. 9 is a flowchart showing an exemplary method for injecting automated mail recognition processing into an existing manual REC system.
Figure 10:
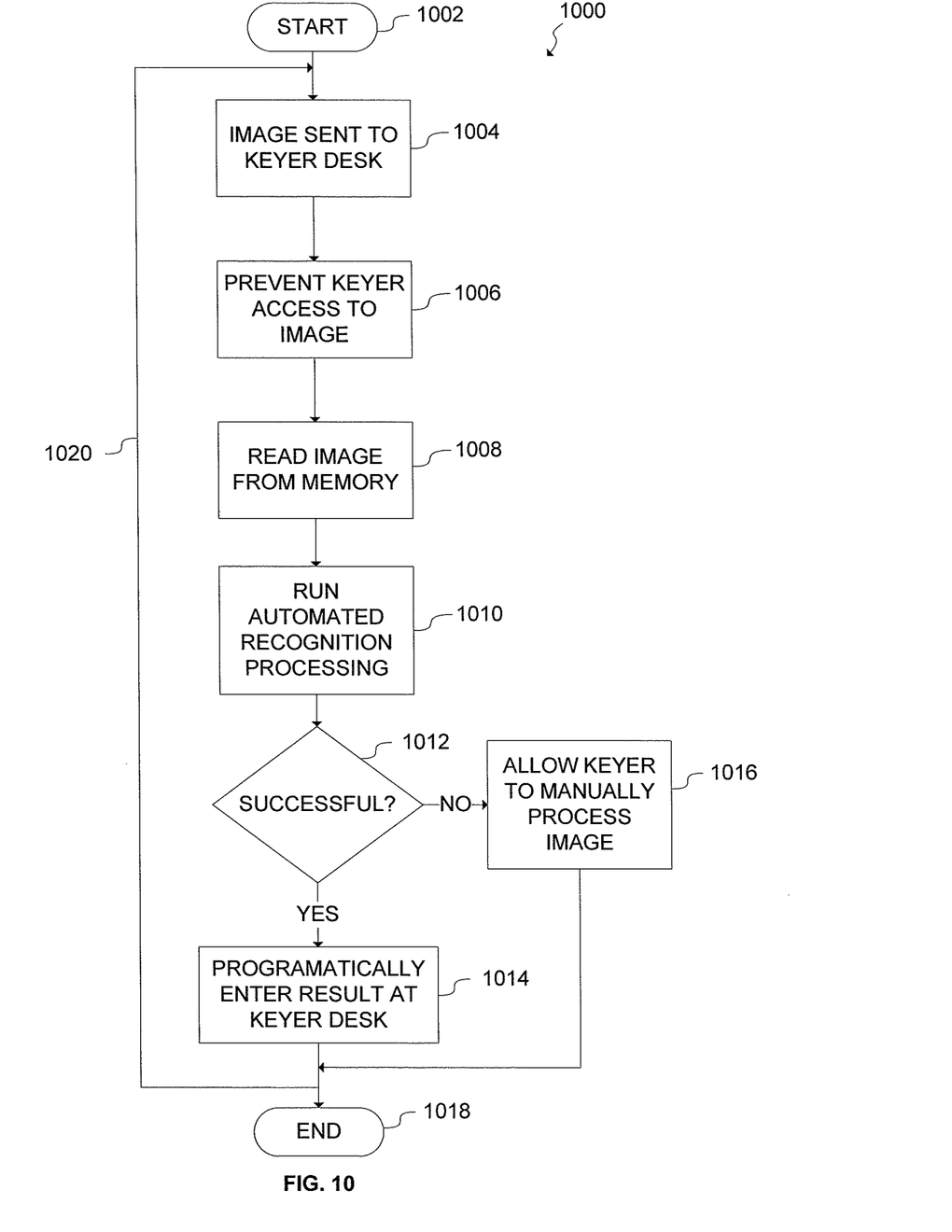
FIG. 10 is a flowchart showing an exemplary method for embedding automated mail recognition processing into an existing manual REC system.

The REC automation system 204 can perform automated mail recognition processing on the intercepted and/or captured mail piece scan image according to the processes shown in FIGS. 8, 9, and 10. If the REC automation system 204 is able to successfully process the mail piece scan image, computer recognized address portions can be transmitted to the MPE 202. If the REC automation system 204 is unable to process the mail piece scan image, the image can be transmitted by the REC automation system 204 to the keyer control center 206 so that manual processing can be performed.

The keyer control center 206 can transmit the mail piece scan image to the keyer desk 208. At keyer desk 208, a mail piece scan image can be displayed to a human keyer for visual inspection and the keyer can manually enter or key in the addressing information contained in the image. The keyer control center 206 can receive the manually keyed in addressing information from the keyer desk 208 and can transmit this addressing information to the MPE 202.

It will be appreciated that the mail piece scan images transmitted by the MPE 202 can be intercepted and/or captured by the REC automation system 204 such that the configurations of the MPE 202 and/or the keyer control center 206 need not be substantially altered. For example, the configuration of the network connecting the MPE 202 and the keyer control center 206 can be altered such that all messages sent by the MPE 202 to the keyer control center 206 are redirected to and/or routed through the REC automation system 204. For example, a network switch can be configured to redirect manual mail processing requests to the REC automation system 204. In another example, the REC automation system 204 can act as a network switch and/or router and can intercept and/or capture any manual mail processing requests being transmitted to the manual REC.

It will be appreciated that the addressing information resolved by processing the mail piece scan image can include the full destination address, the destination ZIP, the destination ZIP+4, the destination eleven digit ZIP (ZIP+4 and two digit delivery point), the full return address, or any other addressing information contained within the mail piece scan image.

Figure 3:
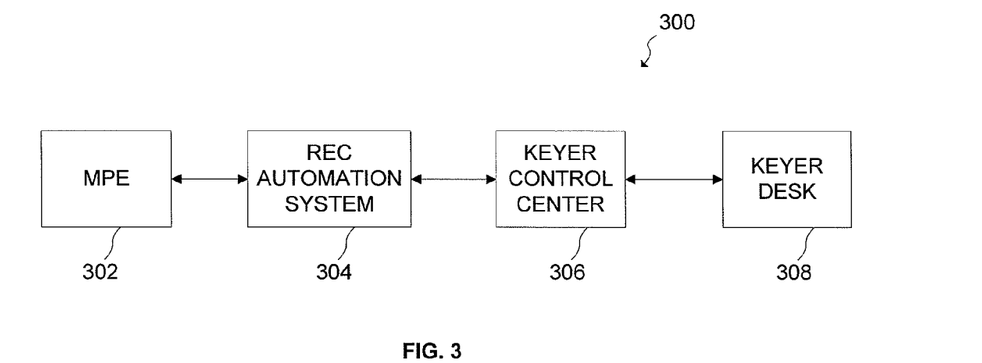
FIG. 3 is a block diagram of an exemplary embodiment of an MPE request intercepting automated remote encoding system.

FIG. 3 is a block diagram of an exemplary embodiment of an MPE request intercepting automated remote encoding system. System 300 can include an MPE (mail processing equipment) 302, an REC (remote encoding center) automation system 304, a keyer control center 306, and/or a keyer desk 308.

In operation, the MPE 302 may be unable to resolve a mail piece scan image and can request manual processing of that image at a manual REC. A manual REC can include a keyer control center 306 that can receive requests for manual processing of mail piece scan images and distribute the images for manual processing to keyer desks, an example of which is given by keyer desk 308. The REC automation system 304 can intercept and/or capture each mail piece scan image transmitted by the MPE 302 before the image is received by the manual REC at the keyer control center 306.

The REC automation system 304 can perform automated mail recognition processing on the intercepted and/or captured mail piece scan image according to the processes shown in FIGS. 8, 9, and 10. If the REC automation system 304 is able to successfully process the mail piece scan image, computer recognized address portions can be transmitted to the MPE 302. If the REC automation system 304 is unable to process the mail piece scan image, the image can be transmitted by the REC automation system 304 to the keyer control center 306 so that manual processing can be performed.

The keyer control center 306 can transmit the mail piece scan image to the keyer desk 308. At keyer desk 308, a mail piece scan image can be displayed to a human keyer for visual inspection and the keyer can manually enter or key in the addressing information contained in the image. The keyer control center 306 can receive the manually keyed in addressing information from the keyer desk 308 and can transmit this addressing information to the MPE 302. The REC automation system 304 can also intercept and/or capture the manually entered addressing information transmitted by the keyer control center 306 to the MPE 302.

The REC automation system 304 can log and/or store the intercepted and/or captured the manually entered addressing information such that the addressing information can be associated with the mail piece scan image in order to improve the automated mail recognition processing employed by the REC automation system. The REC automation system can transmit the manually entered addressing information to the MPE 302.

It will be appreciated that the mail piece scan images transmitted by the MPE 302 can be intercepted and/or captured by the REC automation system 304 such that the configurations of the MPE 302 and/or the keyer control center 306 need not be substantially altered. For example, the configuration of the network connecting the MPE 302 and the keyer control center 306 can be altered such that all messages sent by the MPE 302 to the keyer control center 306 are redirected to and/or routed through the REC automation system 304. For example, a network switch can be configured to redirect manual mail processing requests to the REC automation system 304. In another example, the REC automation system 304 can act as a network switch and/or router and can intercept and/or capture any manual mail processing requests being transmitted to the manual REC.

It will be appreciated that the addressing information resolved by processing the mail piece scan image can include the full destination address, the destination ZIP, the destination ZIP+4, the destination eleven digit ZIP (ZIP+4 and two digit delivery point), the full return address, or any other addressing information contained within the mail piece scan image.

Figure 4:
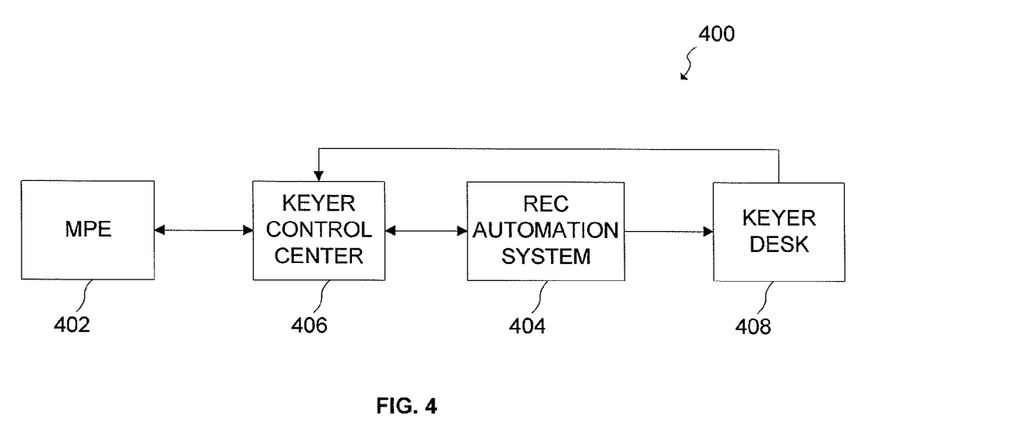
FIG. 4 is a block diagram of an exemplary embodiment of a keyer request intercepting automated remote encoding system.

FIG. 4 is a block diagram of an exemplary embodiment of a keyer request intercepting automated remote encoding system. System 400 can include an MPE (mail processing equipment) 402, a REC (remote encoding center) automation system 404, a keyer control center 406, and/or a keyer desk 408.

In operation, the MPE 402 may be unable to resolve a mail piece scan image and can request manual processing of that image at a manual REC. A manual REC can include a keyer control center 406 that can receive requests for manual processing of mail piece scan images and distribute the images for manual processing to keyer desks, an example of which is given by keyer desk 408. The MPE 402 can transmit a mail piece scan image to the keyer control center 406 for manual processing and the keyer control center 406 can transmit the mail piece scan to the keyer desk 408. The REC automation system 404 can intercept and/or capture each mail piece scan image transmitted by the keyer control center 406 before the image is received by the keyer desk 408.

The REC automation system 404 can perform automated mail recognition processing on the intercepted and/or captured mail piece scan image according to the processes shown in FIGS. 8, 9, and 10. If the REC automation system 404 is able to successfully process the mail piece scan image, computer recognized address portions can be transmitted to the keyer control center 404. If the REC automation system 204 is unable to process the mail piece scan image, the image can be transmitted by the REC automation system 404 to the keyer desk 208 so that manual processing can be performed.

At keyer desk 408, a mail piece scan image can be displayed to a human keyer for visual inspection and the keyer can manually enter or key in the addressing information contained in the image. The keyer control center 406 can receive the manually keyed in addressing information from the keyer desk 408 and can transmit this addressing information to the MPE 402.

It will be appreciated that the mail piece scan images transmitted by the keyer control center 406 can be intercepted and/or captured by the REC automation system 404 such that the configurations of the keyer control center 406 and/or the keyer desk 408 need not be substantially altered. For example, the configuration of the network connecting the keyer desk 408 and the keyer control center 406 can be altered such that all messages sent by the keyer control center 406 to the keyer desk 408 are redirected to and/or routed through the REC automation system 404. For example, a network switch can be configured to redirect manual mail processing requests to the REC automation system 404. In another example, the REC automation system 404 can act as a network switch and/or router and can intercept and/or capture any manual mail processing requests being transmitted to the manual REC.

It will be appreciated that the addressing information resolved by processing the mail piece scan image can include the full destination address, the destination ZIP, the destination ZIP+4, the destination eleven digit ZIP (ZIP+4 and two digit delivery point), the full return address, or any other addressing information contained within the mail piece scan image.

Figure 5:
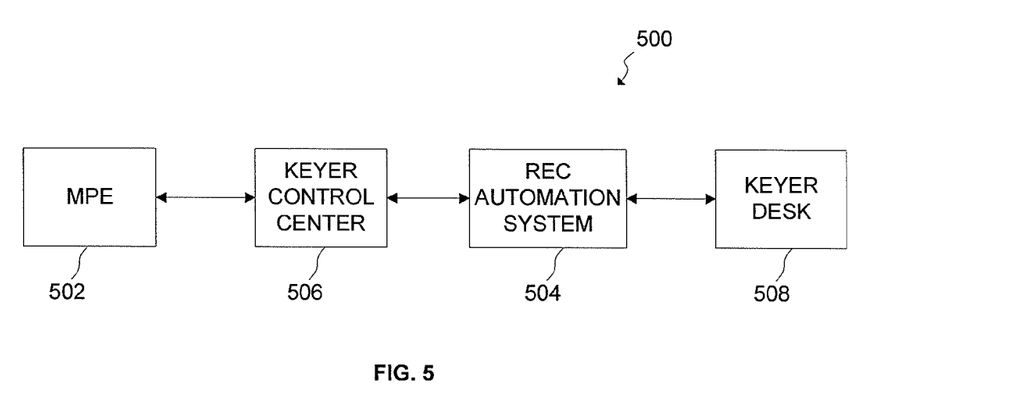
FIG. 5 is a block diagram of an exemplary embodiment of a keyer request intercepting automated remote encoding system.

FIG. 5 is a block diagram of an exemplary embodiment of a keyer request intercepting automated remote encoding system. System 500 can include an MPE (mail processing equipment) 502, a REC (remote encoding center) automation system 504, a keyer control center 506, and/or a keyer desk 508.

In operation, the MPE 502 may be unable to resolve a mail piece scan image and can request manual processing of that image at a manual REC. A manual REC can include a keyer control center 506 that can receive requests for manual processing of mail piece scan images and distribute the images for manual processing to keyer desks, an example of which is given by keyer desk 508. The MPE 502 can transmit a mail piece scan image to the keyer control center 406 for manual processing and the keyer control center 506 can transmit the mail piece scan to the keyer desk 508. The REC automation system 504 can intercept and/or capture each mail piece scan image transmitted by the keyer control center 506 before the image is received by the keyer desk 508.

The REC automation system 404 can perform automated mail recognition processing on the intercepted and/or captured mail piece scan image according to the processes shown in FIGS. 8, 9, and 10. If the REC automation system 504 is able to successfully process the mail piece scan image, computer recognized address portions can be transmitted to the keyer control center 504. If the REC automation system 504 is unable to process the mail piece scan image, the image can be transmitted by the REC automation system 404 to the keyer desk 508 so that manual processing can be performed.

At keyer desk 508, a mail piece scan image can be displayed to a human keyer for visual inspection and the keyer can manually enter or key in the addressing information contained in the image. The keyer control center 506 can receive the manually keyed in addressing information from the keyer desk 508 and can transmit this addressing information to the MPE 502. The REC automation system 504 can also intercept and/or capture the manually entered addressing information transmitted by the keyer desk 508 to the keyer control center 506.

The REC automation system 504 can log and/or store the intercepted and/or captured the manually entered addressing information such that the addressing information can be associated with the mail piece scan image in order to improve the automated mail recognition processing employed by the REC automation system. The REC automation system can transmit the manually entered addressing information to the keyer control center 506.

It will be appreciated that the mail piece scan images transmitted by the keyer control center 506 can be intercepted and/or captured by the REC automation system 504 such that the configurations of the keyer control center 506 and/or the keyer desk 508 need not be substantially altered. For example, the configuration of the network connecting the keyer desk 508 and the keyer control center 506 can be altered such that all messages sent by the keyer control center 506 to the keyer desk 508 are redirected to and/or routed through the REC automation system 504. For example, a network switch can be configured to redirect manual mail processing requests to the REC automation system 504. In another example, the REC automation system 504 can act as a network switch and/or router and can intercept and/or capture any manual mail processing requests being transmitted to the manual REC.

It will be appreciated that the addressing information resolved by processing the mail piece scan image can include the full destination address, the destination ZIP, the destination ZIP+4, the destination eleven digit ZIP (ZIP+4 and two digit delivery point), the full return address, or any other addressing information contained within the mail piece scan image.

Figure 6:
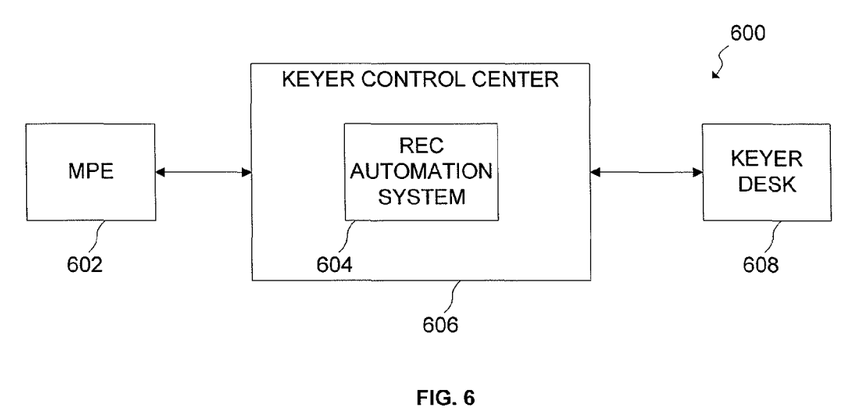
FIG. 6 is a block diagram of an exemplary embodiment of an automated remote encoding system embedded within a keyer control center system.

FIG. 6 is a block diagram of an exemplary embodiment of an automated remote encoding system embedded within a keyer control center system. System 600 can include an MPE (mail processing equipment) 602, a keyer control center 606, and/or a keyer desk 608. The keyer control center 606 can include a REC (remote encoding center) automation system 604.

In operation, the MPE 602 may be unable to resolve a mail piece scan image and can request manual processing of that image at a manual REC. A manual REC can include a keyer control center 606 that can receive requests for manual processing of mail piece scan images and distribute the images for manual processing to keyer desks, an example of which is given by keyer desk 608. The REC automation system 604 can intercept and/or capture each mail piece scan image transmitted by the MPE 602 at the keyer control center 306.

The REC automation system 604 can prevent the keyer control center 606 from distributing the mail piece scan image to a keyer desk and can perform automated mail recognition processing on the intercepted and/or captured mail piece scan image according to the processes shown in FIGS. 8, 9, and 10. If the REC automation system 604 is able to successfully process the mail piece scan image, computer recognized address portions can be transmitted to the MPE 602. If the REC automation system 604 is unable to process the mail piece scan image, the keyer control center 606 can resume processing of the mail piece scan image and distribute the image to a keyer desk so that manual processing can be performed.

The keyer control center 606 can transmit the mail piece scan image to the keyer desk 608. At keyer desk 608, a mail piece scan image can be displayed to a human keyer for visual inspection and the keyer can manually enter or key in the addressing information contained in the image. The keyer control center 606 can receive the manually keyed in addressing information from the keyer desk 608 and can transmit this addressing information to the MPE 602. The REC automation system 604 can also intercept and/or capture the manually entered addressing information transmitted by the keyer control center 606 to the MPE 602.

The REC automation system 604 can log and/or store the intercepted and/or captured the manually entered addressing information such that the addressing information can be associated with the mail piece scan image in order to improve the automated mail recognition processing employed by the REC automation system. The REC automation system can transmit the manually entered addressing information to the MPE 602.

It will be appreciated that the mail piece scan images transmitted by the MPE 602 can be intercepted and/or captured by the REC automation system 604 such that the configurations of the MPE 602 and/or the keyer control center 606 need not be substantially altered. For example, network components can be configured such that messages sent by the MPE 602 to the keyer control center 606 are routed to a different network port on the keyer control center 606 that can be used by the REC automation system 604.

It will be appreciated that the addressing information resolved by processing the mail piece scan image can include the full destination address, the destination ZIP, the destination ZIP+4, the destination eleven digit ZIP (ZIP+4 and two digit delivery point), the full return address, or any other addressing information contained within the mail piece scan image.

Figure 7:
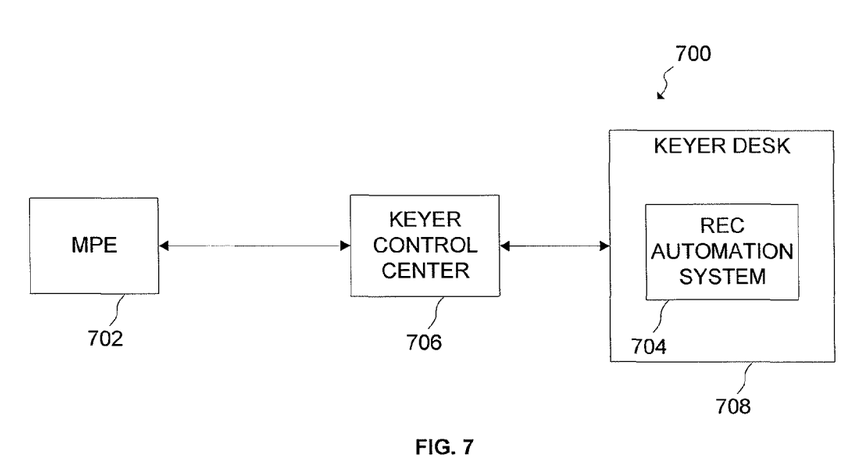
FIG. 7 is a block diagram showing an exemplary embodiment of an automated remote encoding system embedded within a keyer desk system.

FIG. 7 is a block diagram showing an exemplary embodiment of an automated remote encoding system embedded within a keyer desk system. System 700 can include an MPE (mail processing equipment) 702, a keyer control center 706, and/or a keyer desk 708. The keyer desk 708 can include a REC (remote encoding center) automation system 704.

In operation, the MPE 702 may be unable to resolve a mail piece scan image and can request manual processing of that image at a manual REC. A manual REC can include a keyer control center 706 that can receive requests for manual processing of mail piece scan images and distribute the images for manual processing to keyer desks, an example of which is given by keyer desk 708. The MPE 702 can transmit a mail piece scan image to the keyer control center 706 for manual processing and the keyer control center 706 can transmit the mail piece scan to the keyer desk 708. The REC automation system 704 can prevent the keyer desk 708 from displaying the mail piece scan image to the human keyer (user).

The REC automation system 704 can perform automated mail recognition processing on the mail piece scan image according to the processes shown in FIGS. 8, 9, and 10. If the REC automation system 404 is able to successfully process the mail piece scan image, computer recognized address portions can be sent to the keyer desk software component via keystroke events that emulate the keystrokes that the human keyer (user) is required to enter. If the REC automation system 204 is unable to process the mail piece scan image, the keyer desk 708 can be allowed to display the mail piece scan image to the human keyer (user) for visual inspection and the keyer can manually enter or key in the addressing information contained in the image. The keyer control center 706 can receive the manually keyed in addressing information from the keyer desk 708 and can transmit this addressing information to the MPE 702.

It will be appreciated that the addressing information resolved by processing the mail piece scan image can include the full destination address, the destination ZIP, the destination ZIP+4, the destination eleven digit ZIP (ZIP+4 and two digit delivery point), the full return address, or any other addressing information contained within the mail piece scan image.

FIG. 8 is a flowchart showing an exemplary method for retrofitting a legacy manual remote encoding center with automated mail recognition processing. Processing begins at 802 and continues to 804.

At 804, an originating MPE fails to resolve a mail piece scan image and requests manual mail recognition processing a manual REC. MPE resolve addressing information contained within mail piece scan images using software similar to optical character recognition, barcode reading, database queries, or other similar techniques. A mail piece scan image can include a digital image of a portion of a mail piece containing addressing information. The originating MPE may be unable to resolve some mail piece scan images and for these unresolved images the originating MPE can request manual mail recognition processing by a human keyer at a manual REC. As shown in FIGS. 2, 3, 4, and 5, a manual REC can include a keyer control center (e.g. 206, 306, 406, and 506) that can receive requests for manual processing of mail piece scan images and distribute the images for manual processing to keyer desks (e.g. 208, 308, 408, and 508). Processing continues to 806.

At 806, the MPE request for manual mail recognition processing is intercepted and/or captured at the REC automation system. The request for manual mail recognition processing is intercepted and/or captured before the request is received by the keyer control center (e.g. 206 and 306), as shown FIGS. 2 and 3, or before the request is received by the keyer desk (e.g. 408 and 508), as shown in FIGS. 4 and 5. Interception and/or capture can be achieved with minimal and/or insubstantial changes to the configuration of the MPE, the keyer control center or keyer desks. For example, networking components can be configured to redirect all requests for manual mail recognition processing being transmitted between the MPE and the keyer control center to the REC automation system. In another example, networking components can be configured to redirect all requests for manual mail recognition processing being transmitted between the keyer control center and the keyer desks to the REC automation system. Processing continues to 808.

At 808, automated mail recognition processing is performed on the mail piece scan image. If automated mail recognition processing is successful, a plurality of computer recognized addressing portions is created corresponding to the addressing information written and/or printed on the mail piece associated with the mail piece scan image. If the automated mail recognition processing is successful a mail piece scan image processing result can be generated containing the computer recognized address portions. Processing continues to 810.

At 810, a decision is made based on the result at 808. Processing continues to 812 if processing at 808 was successful (the REC automation system was able to successfully resolve the mail piece scan image) and to 814 if processing at 808 was not successful (the REC automation system was unable to resolve the mail piece scan image).

At 812, the mail piece scan image processing result is transmitted to the originating MPE. Processing continues to 816, where processing ends.

At 814, the MPE request for manual mail recognition processing is forwarded to a component in the manual REC so that manual processing by a human keyer can be performed. The request can be forwarded to the keyer control center (e.g. 206 and 306), as shown FIGS. 2 and 3, or to the keyer desk (e.g. 408 and 508), as shown in FIGS. 4 and 5. Processing continues to 816, where processing ends.

It will be appreciated that operations 804-814 may be repeated in whole or in part (an example of which is indicated by line 818) to process multiple mail piece scan images.

It will be appreciated that the addressing information resolved by processing the mail piece scan image can include the full destination address, the destination ZIP, the destination ZIP+4, the destination eleven digit ZIP (ZIP+4 and two digit delivery point), the full return address, and/or any other addressing information contained within the mail piece scan image.

FIG. 9 is a flowchart showing an exemplary method for injecting automated mail recognition processing into an existing manual REC system. Processing begins at 902 and continues to 904.

At 904, an originating MPE fails to resolve a mail piece scan image and requests manual mail recognition processing a manual REC. MPE resolve addressing information contained within mail piece scan images using software similar to optical character recognition, barcode reading, database queries, or other similar techniques. A mail piece scan image can include a digital image of a portion of a mail piece containing addressing information. The originating MPE may be unable to resolve some mail piece scan images and for these unresolved images the originating MPE can request manual mail recognition processing by a human keyer at a manual REC. As shown in FIGS. 2, 3, 4, and 5, a manual REC can include a keyer control center (e.g. 206, 306, 406, and 506) that can receive requests for manual processing of mail piece scan images and distribute the images for manual processing to keyer desks (e.g. 208, 308, 408, and 508). Processing continues to 906.

At 906, the MPE request for manual mail recognition processing is intercepted and/or captured at the REC automation system. The request for manual mail recognition processing is intercepted and/or captured before the request is received by the keyer control center (e.g. 206 and 306), as shown FIGS. 2 and 3, or before the request is received by the keyer desk (e.g. 408 and 508), as shown in FIGS. 4 and 5. Interception and/or capture can be achieved with minimal and/or insubstantial changes to the configuration of the MPE, the keyer control center or keyer desks. For example, networking components can be configured to redirect all requests for manual mail recognition processing being transmitted between the MPE and the keyer control center to the REC automation system. In another example, networking components can be configured to redirect all requests for manual mail recognition processing being transmitted between the keyer control center and the keyer desks to the REC automation system. Processing continues to 908.

At 908, automated mail recognition processing is performed on the mail piece scan image. If automated mail recognition processing is successful, a plurality of computer recognized addressing portions is created corresponding to the addressing information written and/or printed on the mail piece associated with the mail piece scan image. If the automated mail recognition processing is successful a mail piece scan image processing result can be generated containing the computer recognized address portions. Processing continues to 910.

At 910, a decision is made based on the result at 908. Processing continues to 912 if processing at 908 was successful (the REC automation system was able to successfully resolve the mail piece scan image) and to 914 if processing at 908 was not successful (the REC automation system was unable to resolve the mail piece scan image).

At 914, the MPE request for manual mail recognition processing is forwarded to a component in the manual REC so that manual processing by a human keyer can be performed. The request can be forwarded to the keyer control center (e.g. 206 and 306), as shown FIGS. 2 and 3, or to the keyer desk (e.g. 408 and 508), as shown in FIGS. 4 and 5. Processing continues to 916, where processing ends.

At 916, the processing result generated by the component in the manual REC to which the MPE request was forwarded at 914 is intercepted and/or captured at the REC automation system. Processing continues to 912.

At 912, the processing result is transmitted from the REC automation system to the originating MPE. Processing continues to 918, where processing ends.

It will be appreciated that operations 904-916 may be repeated in whole or in part (an example of which is indicated by line 920) to process multiple mail piece scan images.

It will be appreciated that the addressing information resolved by processing the mail piece scan image can include the full destination address, the destination ZIP, the destination ZIP+4, the destination eleven digit ZIP (ZIP+4 and two digit delivery point), the full return address, and/or any other addressing information contained within the mail piece scan image.

FIG. 10 is a flowchart showing an exemplary method for embedding automated mail recognition processing into an existing manual REC system. Processing begins at 1002 and continues to 1004.

At 1004, a mail piece scan image is sent to a keyer desk for manual processing including visual inspection and manual keyboard entry by a human keyer. A keyer desk software component causes the mail piece scan image to be displayed on a computer display component and waits to receive processing results to be keyed in by the human keyer (user). Processing continues to 1006.

At 1006, the REC automation system component can detect a request by the keyer desk software component to display the mail piece scan image and the REC automation system component can prevent the mail piece scan image from being displayed. Processing continues to 1008.

At 1008, the mail piece scan image can be read from memory by the REC automation system component. A copy of the mail piece scan image can be created. Processing continues to 1010.

At 1010, automated recognition processing is performed on the mail piece scan image by the REC automation system component. Processing continues to 1012.

At 1012, a decision is made based on the result at 1010. Processing continues to 1014 if processing at 1010 was successful (the REC automation system component was able to successfully resolve the mail piece scan image) and to 1016 if processing at 1010 was not successful (the REC automation system component was unable to resolve the mail piece scan image).

At 1014, the automated recognition processing result is sent to the keyer desk software component. Processing continues to 1018, where processing ends.

At 1016, the keyer desk software component is allowed to display the mail piece scan image on the computer display for manual processing by the human keyer (user). Processing continues to 1018, where processing ends.

It will be appreciated that operations 1004-1016 may be repeated in whole or in part (an example of which is indicated by line 1020) to process multiple mail piece scan images.

It will be appreciated that sending the automated recognition processing result to the keyer desk software component can include sending keystroke events to the keyer desk software component in a manner that emulates the keypresses required of the human keyer (user) when manually resolving the mail piece image.

It will also be appreciated that the REC automation system component can delegate mail recognition processing of the mail piece scan image by transmitting the mail piece scan image to an automated mail recognition processing system and receiving an automated mail recognition processing system response from the automated mail recognition processing system.

Figure 11:
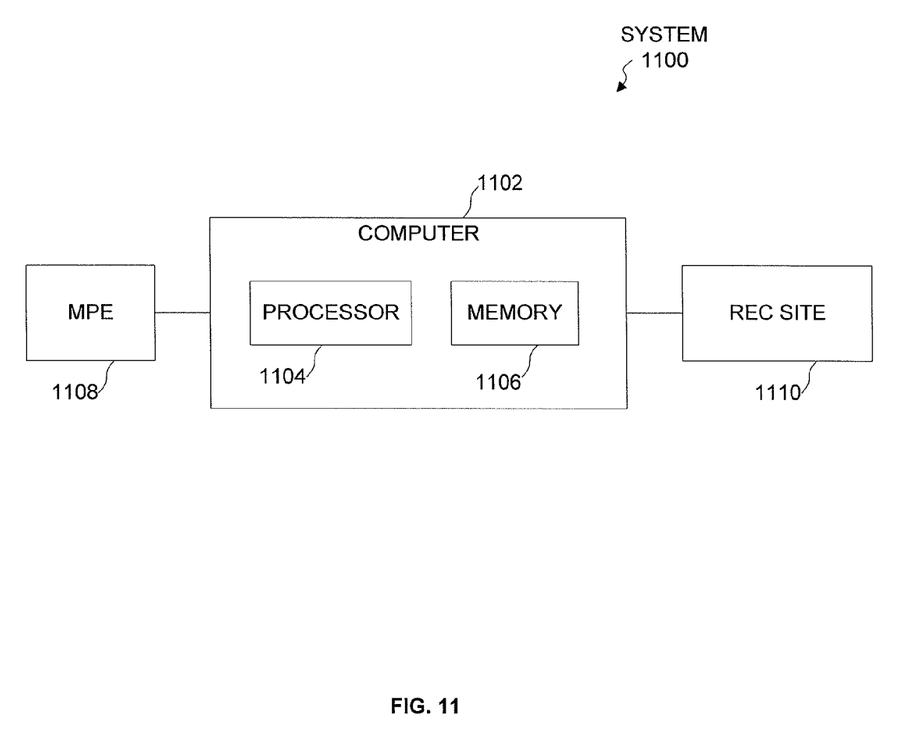
FIG. 11 is a block diagram of an exemplary embodiment of an automated remote encoding system.

FIG. 11 is a block diagram of an exemplary embodiment of an automated remote encoding system. System 1100 can include a computer 1102 that can include a processor 1104 and a memory 1106. The computer 1102 can receive mail piece scan images from and/or transmit mail piece scan image processing results to one or more MPE (or mail processing equipment) 1108. The computer 1102 can transmit mail piece scan images to and/or receive mail piece scan image manual processing results from a manual REC 1108.

In operation, the processor 1104 will execute instructions stored on the memory 1106 that cause the computer 1102 to receive mail piece scan images from and/or transmit mail piece scan image processing results to and/or one or more mail processing equipment 1108 and transmit mail piece scan images to and/or receive mail piece scan image manual processing results from the manual REC 1110 according to the processes shown in FIGS. 8, 9 and 10.

It will be appreciated that the mail processing equipment 1108 may be attached to the system using any connection type such as, but not limited to, a network, a local area network (LAN), a wide area network (WAN), an intranet, the Internet, or any other wired or wireless connection now known or later developed.

It will also be appreciated that the manual REC 1110 may be attached to the system using any connection type such as, but not limited to, a network, a local area network (LAN), a wide area network (WAN), an intranet, the Internet, or any other wired or wireless connection now known or later developed.

It will also be appreciated that one or more components of the manual REC 1110 may be a software component included as part of the instructions stored on the memory 1106 executed by the processor 1104. For example, the REC automation system can run as a software component on the same system as the keyer control center 606 and/or the keyer desk 708, as shown in FIGS. 6 and 7, respectively.

It will be appreciated that the modules, processes, systems, and sections described above can be implemented in hardware, hardware programmed by software, software instructions stored on a nontransitory computer readable medium or a combination of the above. A remote encoding center automation system, for example, can include using a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a nontransitory computer-readable medium such as a computer memory or transponder device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hardwired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the computer programming and postal address recognition arts.

Moreover, embodiments of the disclosed method, system, and computer program product can be implemented in software executed on a programmed general purpose computer, a special purpose computer, a microprocessor, or the like.

It is, therefore, apparent that there is provided, in accordance with the various embodiments disclosed herein, computer systems, methods and software for remote encoding center automation.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the invention.

What is claimed is:

1. A computer system configured to provide automated mail recognition processing to a legacy manual mail recognition processing system, said computer system comprising:
   a processor; and
   a memory coupled to the processor, the memory having stored therein software instructions that, when executed by the processor, cause the processor to perform operations including:
      receiving a manual mail recognition processing request from an originating mail processing component, said manual mail recognition processing request including a mail piece scan image, said originating mail processing component having failed to automatically resolve an address in said mail piece scan image, said manual mail recognition processing request requesting manual processing of said mail piece scan image by a human, said mail piece scan image comprising a digital image of at least a portion of a mail piece;
      ignoring said request for manual processing of said mail piece scan image by a human and instead forwarding said mail piece scan image to an automated mail recognition processing system;
      receiving an automated mail recognition processing response from said automated mail recognition processing system, said automated mail recognition processing response including automatically recognized addressing data corresponding to said mail piece scan image if said automated mail recognition processing system was able to successfully resolve said mail piece scan image;

transmitting a mail piece scan image processing result comprising at least a portion of said automatically recognized addressing data to said originating mail processing component when said automated mail recognition processing system is able to successfully resolve said mail piece image; and transmitting said mail piece scan image to said manual mail recognition system when said automated mail recognition processing system is not able to successfully resolve said mail piece image.

2. The computer system of claim 1, wherein said automatically recognized addressing data includes a destination ZIP code of said mail piece.

3. The computer system of claim 1, wherein said automatically recognized addressing data includes a destination ZIP+4 code of said mail piece.

4. The computer system of claim 1, wherein said automatically recognized addressing data includes a destination eleven digit ZIP code of said mail piece, said eleven digit zip code including a ZIP+4 code and a two digit delivery point.

5. The computer system of claim 1, wherein said automatically recognized addressing data includes a destination mailing address of said mail piece.

6. The computer system of claim 1, wherein, when said automated mail recognition processing system is not able to successfully resolve said mail piece image, said operations further include:

receiving a manual mail recognition system response from said manual mail recognition system, said manual mail recognition system response containing manually keyed addressing data, said manually keyed addressing data corresponding to said mail piece; and transmitting said manual mail recognition system response to said originating mail processing component.

7. A method for retrofitting a legacy manual mail recognition system with automated mail recognition processing without substantially altering the configuration of said existing legacy manual mail recognition system, the method comprising:

redirecting, at a network component, a mail piece scan image manual processing request to an automated recognition processing system, said mail piece scan image manual processing request transmitted by a requesting mail processing component, said mail piece scan image manual processing request including a mail piece scan image, said mail piece scan image including a digital image of at least a portion of a mail piece, and said mail piece scan image manual processing request requesting manual mail recognition processing to be performed on said mail piece scan image by a human;

receiving a mail piece scan image processing result, said mail piece scan image processing result including automatically recognized address information when said automated recognition processing system is able to successfully resolve said mail piece scan image;

transmitting said mail piece scan image processing result to said requesting mail processing component if said processing was successful; and transmitting, said mail piece scan image to a manual recognition system for manual processing if said processing was unsuccessful.

8. The method of claim 7, further comprising:

processing, at said automated recognition processing system, said mail piece scan image, said processing including creating automatically recognized address information when said processing is successful, said automatically recognized address information corresponding to the addressing information of said mail piece captured in said mail piece scan image.

9. The method of claim 8, wherein said processing said mail piece scan image includes performing, at said automated recognition interception computer, mail recognition processing on said mail piece scan image, said mail recognition processing creating said automatically recognized address information corresponding to said mail piece scan image.

10. The method of claim 7, wherein said automatically recognized address information includes a destination ZIP code of said mail piece.

11. The method of claim 7, wherein said automatically recognized address information includes a destination ZIP+4 code of said mail piece.

12. The method of claim 7, wherein said automatically recognized address information includes a destination eleven digit ZIP code of said mail piece, said eleven digit zip code including a ZIP+4 code and a two digit delivery point.

13. The method of claim 8, further comprising:

when said processing is unsuccessful, receiving a manual mail recognition system response from said manual mail recognition system, said manual mail recognition system response containing a manually keyed addressing information, said manually keyed addressing information corresponding to said mail piece scan image; and transmitting said manual mail recognition system response to said originating mail processing component.

14. The method of claim 7, where said network component is a switch.

15. The method of claim 7, where said network component is a router.

16. A nontransitory computer readable medium having stored thereon software instructions that, when executed by a computer, cause the computer to perform operations comprising:

intercepting a manual mail recognition processing request requesting manual processing of a mail piece image, said manual mail recognition processing request transmitted by an originating mail processing component having failed to resolve the mail piece image;

after receiving the manual mail recognition processing request, forwarding said mail piece scan image to an automated mail recognition processing system;

receiving an automated mail recognition processing response from said automated mail recognition processing system, said automated mail recognition processing response including addressing data corresponding to said mail piece scan image when said automated mail recognition processing system was able to successfully resolve said mail piece image;

transmitting at least a portion of said addressing data to said originating mail processing component when said automated mail recognition processing system was able to successfully resolve said mail piece scan image.

17. The computer readable medium of claim 16, wherein said operations further comprise:

when said automated mail recognition processing system was not able to successfully process said mail piece image, intercepting a manual mail recognition system response from said manual mail recognition system, said manual mail recognition system response containing a plurality of addressing data corresponding to said mail piece scan image; and transmitting at least a portion of said plurality of addressing data to said originating mail processing component.

18. The computer readable medium of claim 16, wherein said plurality of addressing data corresponding to said mail piece scan image includes a destination ZIP code of said mail piece.

* * * * *